United States Patent [19]

Flanders et al.

[11] Patent Number: 5,101,528

[45] Date of Patent: Apr. 7, 1992

[54] MACHINE FOR ROUGHING SIDE WALLS PORTIONS OF A SHOE

[75] Inventors: James R. Flanders, Blaby; Richard E. Storer, Syston, both of England

[73] Assignee: British United Shoe Machinery Ltd., Leicester, England

[21] Appl. No.: 622,345

[22] Filed: Nov. 29, 1990

Related U.S. Application Data

[63] Continuation of Ser. No. 531,076, May 31, 1990, abandoned.

[30] Foreign Application Priority Data

Jun. 15, 1989 [GB] United Kingdom ............... 8913786

[51] Int. Cl.$^5$ ..................... H43D 95/00; H43D 95/16
[52] U.S. Cl. ........................................ 12/77; 19/6.5
[58] Field of Search ................. 12/1 R, 77, 78; 69/6.5

[56] References Cited

U.S. PATENT DOCUMENTS

| | | | |
|---|---|---|---|
| 3,174,170 | 3/1965 | Verreault et al. | 69/6.5 |
| 4,391,011 | 7/1983 | Peck et al. | 12/1 B |
| 4,561,139 | 12/1985 | Becka et al. | 69/6.5 |
| 4,691,398 | 9/1987 | Kadogawa et al. | 69/6.5 |
| 4,951,338 | 8/1990 | Brown et al. | 12/77 |

FOREIGN PATENT DOCUMENTS

| | | | |
|---|---|---|---|
| 0336632 | 10/1989 | European Pat. Off. | 69/6.5 |
| 1149676 | 12/1957 | France | 69/6.5 |

*Primary Examiner*—Steven N. Meyers

[57] ABSTRACT

The speed of rotation of a side wall roughing tool (250) can be varied in accordances with the speed of relative movement between the tool (250) and side wall portions of the shoe being roughed (the traverse speed of the tool). To this end, a flow control arrangement (F) is provided including a plurality of flow control valves (CV1, CV2), the arrangement being such that, with the rate of flow through each such valve set, the operator can select one or other to be switched into the hydraulic circuit by which a hydraulic motor (232) is driven, said motor effecting rotation of the tool. The selection of one or other flow control valve (CV1, CV2) is made by the operator during the digitishing of the path of the tool relative to the shoe and such information is stored together with the programmed instruction, in the form of digitised corrdiante axis values, for said path.

13 Claims, 4 Drawing Sheets

MACHINE FOR ROUGHING SIDE WALLS PORTIONS OF A SHOE

This is a continuation of copending application Ser. No. 07/531,076 filed on May 31, 1990, now abandoned.

BACKGROUND OF THE INVENTION

This invention is concerned with a machine for roughing side wall portions of a shoe comprising a shoe support, for supporting a shoe with side wall portions thereof to be roughed exposed, a rotary roughing tool supported by a tool support and comprising a plurality of roughing elements mounted for movement in a direction towards and away from the centre of rotation of the tool, the arrangement being such that said elements are urged centrifugally away from said centre by the rotation of the tool, and means for effecting relative movement, in directions extending lengthwise, widthwise and heightwise of the bottom of a shoe supported by the shoe support, between the shoe support and the tool support, whereby the tool is caused to operate progressively along the exposed side wall portions of a shoe supported by the shoe support.

One such machine, is described in co-pending U.S. patent application Ser. No. 377,237 and comprises a shoe support for supporting, bottom uppermost, a shoe with side wall portions thereof to be roughed exposed, said shoe support being mounted for movement along an arcuate path in a direction extending lengthwise of the bottom of a shoe supported thereby, together with a tool support for supporting a rotary roughing tool for movement both widthwise of the bottom of a shoe supported by the shoe support and also heightwise thereof. The means for effecting such relative movement between the shoe support and the tool support comprises a plurality of n.c. motors, e.g. stepping motors, which operate under computer control, in accordance with a programmed instruction in the form of digitised coordinate axis values, to cause the tool to operate progressively along the exposed side wall portions of a shoe supported by the shoe support.

It will be appreciated that, by using a tool of the type referred to above, any variations between the digitised path and the actual shoe shape can be accommodated by greater or less outward movement of the roughing elements, without significantly affecting the quality of the rough.

For determining the path of the tool relative to shoe side wall portions in said machine reference is made to U.S. Pat. No. 4,541,054, in which is set out a method of digitising the bottom of a shoe by determining the coordinates of a plurality of points spaced equi-distantly from one another along the marginal portions of the shoe bottom and storing such points in the form of digitised coordinate axis values. From these points the path of a tool along the marginal portions of a shoe bottom can then be determined. Such a method is also applicable in the case of operating along side wall portions of shoes, except that whereas, in operating on marginal portions of shoe bottoms using a rotary radial roughing tool, the point of contact between the tool and the shoe bottom represents the point which is being actually digitised, in the case of side wall roughing using a rotary radial roughing tool the point of contact of the tool with the side wall is offset from the actual point of digitising by a distance equal to the radius of the tool.

Under such circumstances, it will be appreciated, if the digitised points are spaced equi-distantly, in the region of relatively sharp curvature, e.g. the toe end and heel end of shoes, the points of contact between the tool and side wall of the shoe corresponding to the digitised points will be spaced more closely together. Bearing in mind that, by spacing the points equi-distantly in accordance with the method of U.S. Pat. No. 4,541,054, the speed of relative movement between the tool and the side wall portions of the shoe (the traverse speed of the tool) remains constant or substantially so, it will be appreciated that the reduction of the notional distances between points of contact as described above will have the effect of reducing the traverse speed of the tool in the region of such areas of sharp curvature, namely the toe end and heel end of the shoe. Such a reduction in the traverse speed of course means that the tool operates for a relatively longer period in such areas.

Because of the type of tool used, such reduction in the traverse speed of the tool means that the degree of roughing in such areas is greater than that along the relatively straight side wall portions, which may be detrimental in the finished shoe.

It would of course be possible to digitise the shoe bottom in a different manner so that the path of the operating surface of the tool contacting the shoe is determined and stored in the form of digitised coordinate axis values, in the same way as currently effected in the case of the roughing of marginal portions of shoe bottoms. In such a case, however, it would then be necessary to project the centre of the tool, in order to determine the corresponding path of relative movement between the shoe support and the tool support. Such an arrangement, however, would require a greater amount of computing power, especially bearing in mind that the angle of projection outwardly from the digitised point of contact has to be calculated for each point, which will of course vary according to the location of the particular point along the periphery of the shoe bottom. In addition, it has to be borne in mind that such an arrangement would vary the speed of relative movement between the tool support and the shoe support. In order to obtain an optimum output for the machine, however, desirably the speed of relative movement between the tool support and the shoe support is kept at a maximum during the operation of the machine, so that if the speed is maintained at a maximum as the tool operates around the toe and heel ends of the shoe, necessarily the speed along the side portions of the shoe will be less than the maximum, which is of course detrimental to the machine output.

OBJECT OF THE INVENTION

It is thus the object of the present invention to provide an improved machine for roughing side wall portions of a shoe wherein excessive roughing of the side wall portions can be avoided while maintaining the speed of relative movement between the tool support and the shoe support constant or substantially so.

SUMMARY OF THE INVENTION

This invention is resolved in accordance with the present invention in a machine as set out in the first paragraph above, in that the speed of rotation of the tool is varied, as the tool is caused to operate progressively as aforesaid, in accordance with the speed of relative movement between the tool and the side wall portions of the shoe (the traverse speed of the tool).

It will thus be appreciated that by varying the speed of rotation of the tool in accordance with the traverse speed thereof, the relative speed between the operating surface of the tool and the side wall portion being roughed can be controlled, e.g. be maintained constant or substantially so, without varying the speed of relative movement between the tool support and the shoe support, which thus can be maintained at a maximum, while at the same time ensuring that excessive roughing of any particular side wall portion is avoided.

Such an arrangement can be utilised in machines which rely upon electronic control as well as machines which utilise other forms of control, whether hydraulic, pneumatic or mechanical or any combination thereof. In the case of an electronically controlled machine, it can be envisaged that the traverse speed of the tool relative to the shoe side wall portions be calculated from the stored information relating to the digitised points, and from the calculated traverse speed can then be calculated the desired speed of rotation of the tool to achieve the constant rough along the length of the side wall portions. In a simplified version of an electronically controlled machine in accordance with the invention, however, conveniently the speed of rotation of the tool is selected by the operator during a "teaching" mode of operation of the machine in which the path to be followed by the tool in relation to the shoe is also "taught" and stored. To this end, such machine thus further comprises first operator-actuatable means, operable in a "teaching" mode of operation of the machine, whereby the tool can be positioned at a plurality of selected points along the side wall portions of the shoe and such tool positions can be stored in the form of digitised coordinate axis values in a computer memory, and second operator-actuatable means, also operable in said "teaching" mode, for selecting a speed of rotation for the tool in association with each of said stored positions and for storing the selection in the computer memory, the arrangement being such that the stored positions represent the path of relative movement between the shoe support and the tool support to be followed in an "operating" mode of the machine, and each stored selection of the speed of rotation of the tool is implemented when its associated stored position is reached.

For achieving a desired degree of control of the speed of rotation of the tool, preferably the tool is caused to be rotated by a motor drive comprising a hydraulic motor and a flow control arrangement by which the flow of hydraulic fluid to the motor can be varied. In the first version of machine envisaged above, the flow control arrangement will of course be subject to electronic control. In the simplified version referred to above, on the other hand, conveniently the motor drive has a plurality of pre-set output speeds and the output speed of the motor drive is selected, from the various pre-settings, for each of the side wall portions of the shoe, according to the traverse speed of the tool along the particular portion as the tool is caused to operate progressively as aforesaid. In said simplified version, furthermore, the flow control arrangement is such as to provide the plurality of pre-set output speeds of the motor drive as aforesaid; this may be by the provision of a variable flow control valve or the like in combination with means for varying the rate of flow of hydraulic fluid therethrough in accordance with signals from the electronic control, or by the provision of a plurality of flow control valves, which are set to allow different rates of flow of hydraulic fluid and which can be selected again under the action of the electronic control. It will of course be appreciated that, where operator-actuatable means is provided as aforesaid, the selection of a desired speed of rotation of the tool under the control of the second operator-actuable means is effective to bring the associated flow control valve into operation when the point associated with such selection is reached.

It has been found that, using the machine in accordance with the invention, improved uniformity of rough can be achieved along the length of the side wall portions of the shoe bottom in a simple but efficient manner.

A further advantage of the machine in accordance with the invention, moreover, is that the speed of rotation of the tool can also be set according to the variations in the degree of rough to be effected at different localities along the side of the shoe.

BRIEF DESCRIPTION OF THE DRAWINGS

There now follows a detailed description, to be read with reference to the accompanying drawings, of on machine in accordance with the invention, which machine has been selected for description merely by way of non-limiting example.

In the accompanying drawings.

DESCRIPTION OF THE PREFERRED EMBODIMENT

Figure 1:
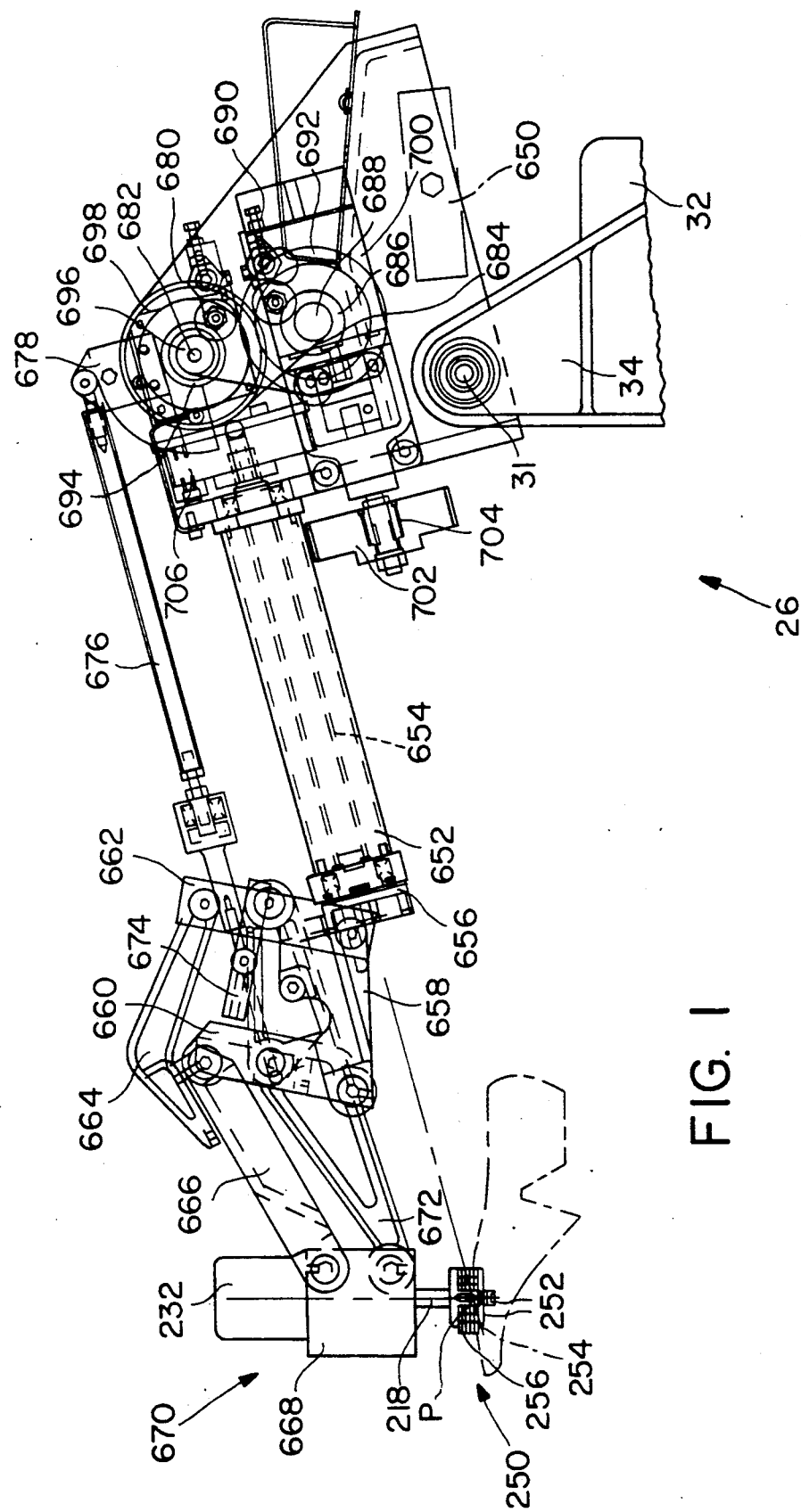
FIG. 1 is a view in side elevation of a tool support arrangement of the machine in accordance with the invention, with a tool supported thereby.

The machine now to be described is generally similar, except as hereinafter described, to the machine described in U.S. patent application Ser. No. 303,045, itself a modification of the apparatus described in U.S. Pat. No. 4,391,011, which machine is for performing a roughing operation progressively along marginal portions of a shoe bottom, whereas the machine described hereinafter, it will be appreciated, is a machine for performing a roughing operation progressively along side wall portions of a shoe. Reliance is thus placed upon the disclosure of the aforementioned EP specification and in particular, where like parts are incorporated in the two machines but are not shown in the drawings of the present specification, the reference numerals from the earlier specification are used, but are placed in brackets to indicate that the parts are not shown in the present drawings.

The machine in accordance with the invention thus comprises a base (10) supporting, by means of a bracket (12), a pivot shaft (14) about which a support (16) for a shoe support (18') can pivot. Details of this shoe support, by which, after a shoe has been positioned thereon, it is locked in position in such a manner that the side wall portions thereof to be roughed are accessible for a roughing operation, are to be found set out in our co-pending U.S. patent application Ser. No. 377,234. At its rear, furthermore, the base (10) supports a support column structure (22) carrying a casting (24) on which is supported, for pivotal movement about a vertical axis, a support casting 34 having two upstanding lugs 32 between which tool supporting means generally designated 26' is supported for pivotal movement about a horizontal axis 31.

The machine further comprises a first stepping motor (144) mounted on the base (10) and effective to cause pivotal movement of the shoe support (18') to take place about the horizontal axis provided by the shaft (14) (X-axis movement). Similarly, a second stepping motor (84) is provided, carried by the casting (24) and effective to cause pivotal movement of the support casting 34 about its vertical axis (Y-axis movement). In addition, a third stepping motor (122—described in EP-A0043645) is supported by the support casting 34, rearwardly of its vertical pivot, to cause it, and thus the tool support means 26' supported thereby, to pivot about its horizontal axis 31 (Z-axis movement). It will be appreciated that the X-, Y- and Z-axes represent three coordinate axes along which a tool supported by the tool supporting means 26' can move. Further details of the construction by which movement along the three axes can take place can be found in the aforementioned U.S. Ser. No. 303,045 and also in U.S. Pat. No. 00043645.

The tool supporting means 26' of the machine in accordance with the invention comprises a housing 650 mounted for pivotal movement about said horizontal axis 31. From a forward face of the housing projects a hollow, tubular arm 652 within which is accommodated, for rotational movement therein, a support rod 654. At the forward end of said rod is a plate 656 supporting two forwardly projecting arms 658, which are spaced apart widthwise of the machine and on each of which is mounted, for pivotal movement, a pair of links 660, 662, upper ends of which pivotally support a plate 664. The links 660, 662, together with the plate 664 and arms 658, thus comprise a first parallel linkage arrangement of the tool supporting means.

Fixedly secured to a forward end of the plate 664, and projecting forwardly therefrom, is a further plate 666, in a forward, bifurcated, end of which is pivotally mounted a block 668 forming part of a tool holder generally designated 670. Also secured to the tool holder, at the left-hand side thereof, is a further link 672 which is in turn pivotally connected to each of the left-hand links 660, 662. The links 660, 662, tool holder 670, link 672 and composite plate 664, 666 thus constitute a second parallel linkage of the tool supporting means. The various pivots are so arranged in relation to one another that the tool holder is caused to pivot about an axis (a virtual centre) which passes through a point P, through which point also passes the axis of the support rod 654. As will be described hereinafter, furthermore, when a tool is supported in the tool holder 670, the axis of rotation thereof also passes through said point P.

For effecting such pivotal, or tilting, movement of the tool holder 670 about the transverse axis, the links 662 carry therebetween a block 674 to which is pivotally connected a forward end of a push-rod 676, the rearward end of which is similarly pivotally connected to a block 678 which is mounted on a pulley 680 freely rotatable about a drive shaft 682. The pulley 680 is caused to rotate about said shaft by a timing belt 684 entrained around a second pulley 688, a tensioning pulley 690 being provided for maintaining the tension in the belt. Also mounted on the shaft 688 is a third pulley 692 around which is entrained a second timing belt 694 meshing with a fourth, drive, pulley 696 secured on the drive shaft 682. The shaft 682 is driven by a stepping motor 698 (constituting third drive means of the machine in accordance with the invention).

For effecting rotational movement of the support rod 654, a similar drive arrangement is provided comprising a stepping motor 700 acting through pulleys 702, 704, 706 (the fourth not being shown) and timing belts (not shown), the pulley 706 being fixedly mounted on the support rod 654. This drive arrangement thus constitutes fourth drive means of the machine in accordance with the invention.

Figure 4:
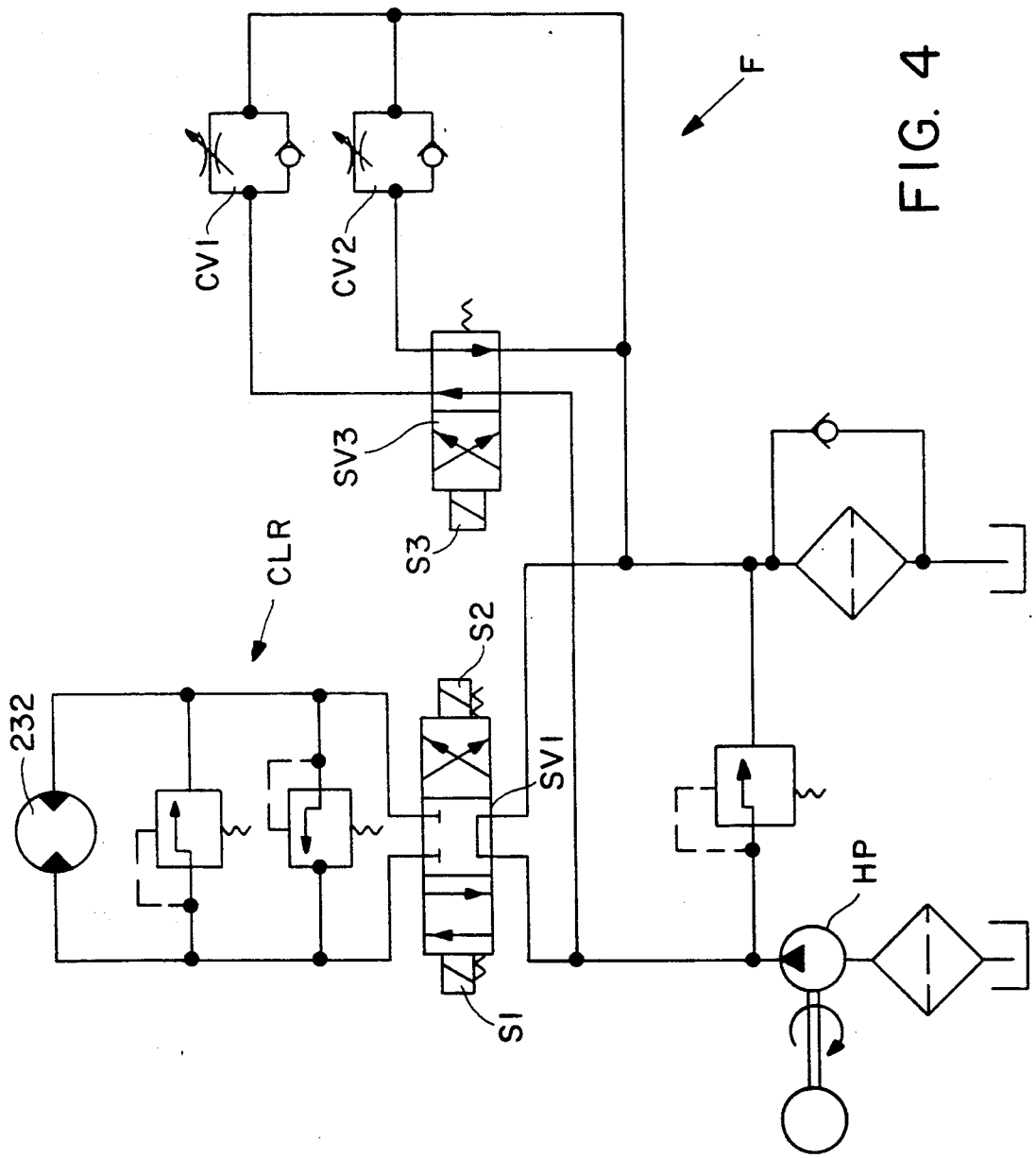
FIG. 4 is a diagram showing details of a hydraulic motor drive for the roughing tool.

The tool holder 670 is arranged to support a tool-supporting shaft 218 which is caused to rotate by means of a reversible motor 232, itself mounted on the tool holder 670 and being operatively connected to the shaft 218 via a belt-and-pulley connection (not shown). The motor 232 is a hydraulic motor forming part of a motor drive as shown in FIG. 4. The motor is driven by hydraulic fluid supplied from a pump HP through a solenoid valve SV1 and a dual cross-line relief valve arrangement generally designated CLR, the solenoid valve SV1 being a three-position valve, in a first, central, position of which the flow of fluid is shut off from the motor, while in the second and third positions, to which the valve is moved by solenoids S1 and S2 respectively against spring returns, the motor can be driven in one or other direction. The cross-line relief valve arrangement CLR is effective to brake the rotation of the motor when the supply of fluid thereto is discontinued. For controlling the flow of fluid to the motor 232, and therefore its output speed, a flow control arrangement generally designated F is also provided comprising a further solenoid valve SV3, which is a two-position valve and comprises a solenoid S3 and spring return. In a first position of solenoid valve SV3, a flow control valve CV1 is introduced into the hydraulic circuit, while in a second position of the solenoid valve a second flow control valve CV2 is switched in. The two flow control valves are of the pressure-compensating type, so that the flow of hydraulic therethrough is constant regardless of the pressure in the hydraulic fluid. The two flow control valves are set to different rates of flow so that different output speeds of the motor 232 can be achieved, according to which flow valve is switched into the circuit.

Whereas only two such flow control valves are shown and utilised in the machine now being described, it will of course be appreciated that a plurality of such valves could be provided, or indeed a single flow control valve the rate of flow through which can be varied under electronic control could be used to replace the two described above.

Figure 2:
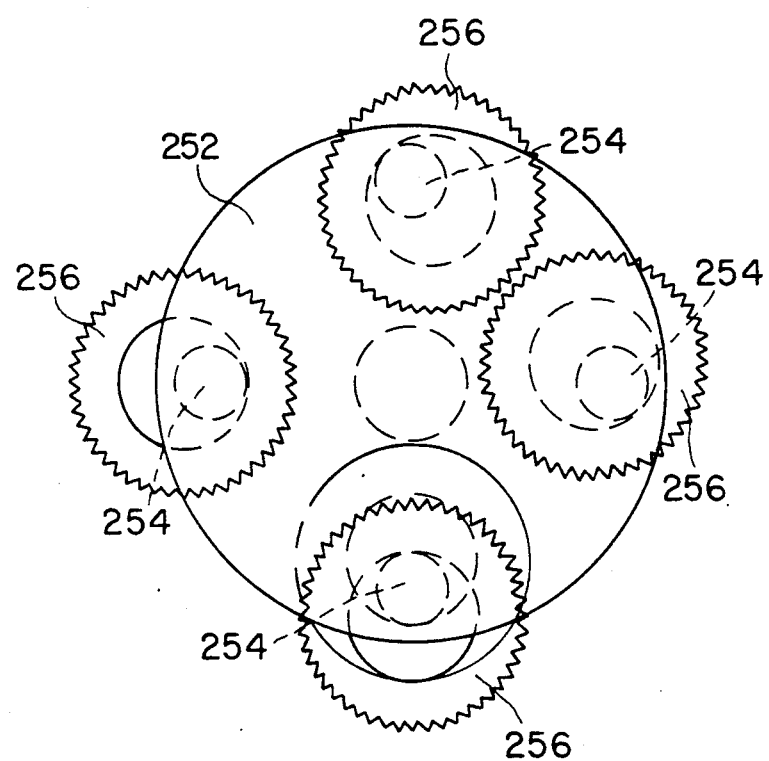
FIGS. 2 and 3 are plan and side views of a roughing tool of the "centrigual" type, FIG. 3 also showing the manner in which roughing elements of the tool conform to the shape of the side wall portion of a shoe being roughed.
Figure 2:
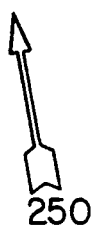
Figure 3:
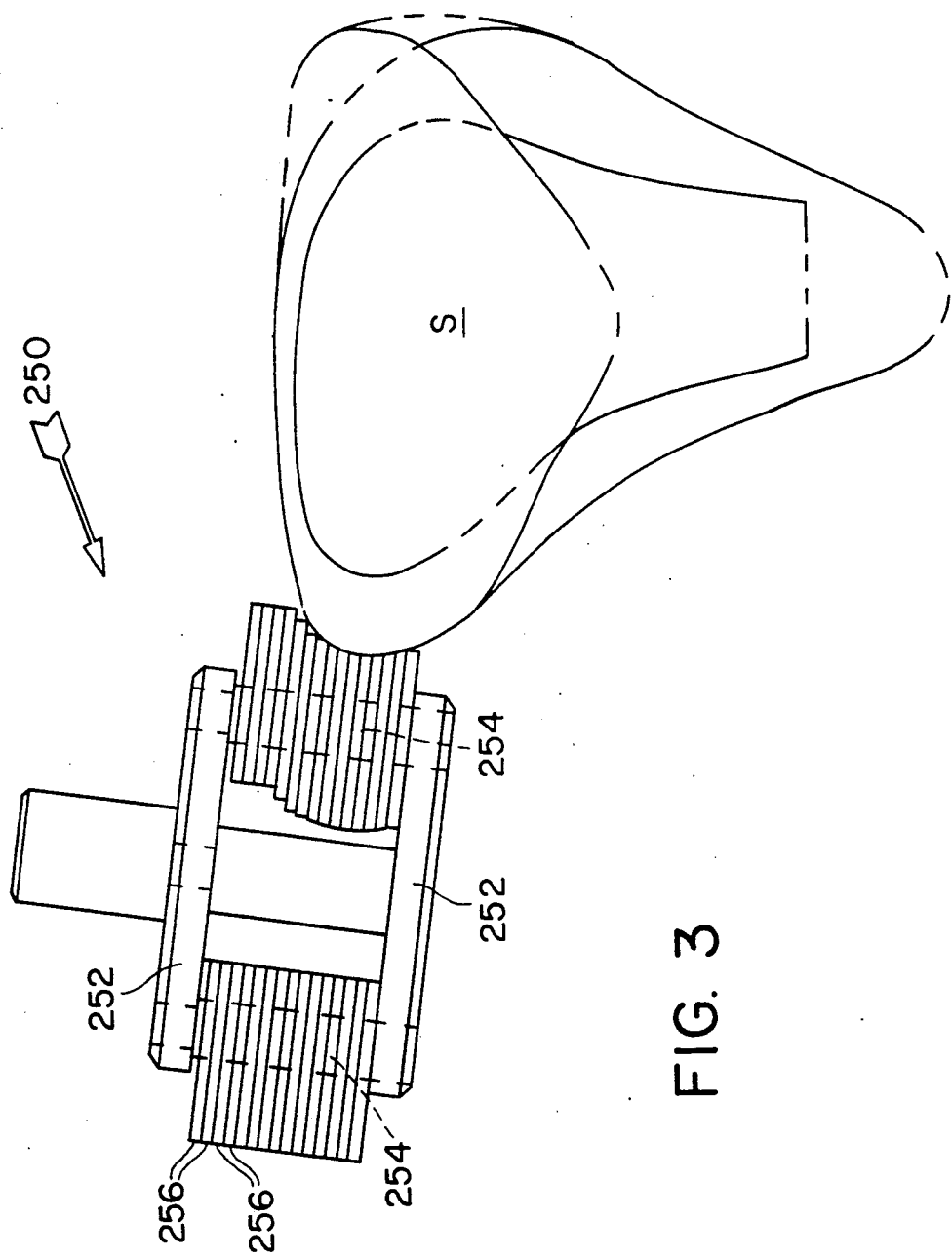

The lower end of the shaft 218 is adapted to receive a suitable roughing tool generally designated 250. Whereas this tool may be any suitable roughing tool, e.g. a radial wire brush or an abrasive-covered wheel, in the emodiment shown in the drawings the tool comprises two discs 252 spaced apart from one another by four pins 254, each pin supporting a plurality of thin plate-like roughing elements 256. As is clearly seen in FIG. 2, each plate-like element 256 is loosely mounted on its pin for pivotal movement thereon, is generally circular in shape and comprises, about its periphery, a plurality of teeth, the teeth providing a roughing surface of the tool. When the tool is caused to rotate, the various plate-like elements are urged outwardly about the pins 252, by virtue of centrifugal force. As clearly shown in FIG. 3, with a plurality of such elements provided on each pin, the amount to which each element is thrown outwardly by centrifugal force will be determined largely by the contour of the shoe which is engaged thereby, each set of such elements thus together forming a shape, upon engagement with the shoe, complementary to the contour of the portion of the side wall of the shoe being roughed thereby. It will also be appreciated that, using a tool as described above, any irregularites in the side wall portion of the shoe being operated upon may be compensated for by the action of the elements 256.

As already mentioned, the machine has both an "operating" mode and a "teaching" mode. For the purpose of the latter, first operator-actuatable means in the form of a joystick or equivalent control (not shown) is provided whereby the path of movement of the tool can be determined; the particular path determination procedure is described in detail in e.g. U.S. Pat. No. 4,541,054, except that, whereas in this latter procedure the point of contact of the operating surface of the tool with the marginal portion of the shoe bottom is the actual point which is digitised, in the present machine in accordance with the invention the point P is spaced from the shoe bottom, and outside thereof, by a distance equivalent to the radius of the tool; it is of course the position of each point P which is "taught".

In addition, second operator-actuatable means is provided, e.g. in the form of a button (not shown), by which the speed of rotation for the tool can be selected by the operator in association with each of the selected positions for the point P to be digitised. In the machine now being described, in which only two speeds of rotation can be set, the button is a simple means for selecting between the two speeds. In other machines in accordance with the invention and otherwise similar to the present machine, but in which more than two speeds of rotation are provided, more complicated operator-actuatable means will be provided, especially in the case of an infinitely variable flow control arrangement, which e.g. would require a digital display and keyboard arrangement.

Also in the machine in accordance with the invention further operator-actuatable means (again not shown) is provided whereby under operator control the angular disposition of the tool holder 670 about the point P can be set, for each digitised point, about the axis of the support rod 654 (usually referred to as the "camber" setting) and also about the virtual centre as determined by the two parallel linkage arrangements referred to above (usually referred to as the "tilt" control). In the "operating" mode, thereafter, not only does the tool follow the path as digitised, but in addition the angular disposition of the tool about said two axes is progressively varied according to the settings made during the "teaching" mode.

For the digitising procedure itself and also for controlling the operation of the machine in its operating mode the machine also comprises computer control means, including a memory in which a number of programmed instructions, each constituted by digitised coordinate axis values relating to selected points along the path of a tool in relation to the side wall portions of a shoe, can be stored for different styles of shoe, together with a number of sub-routines for processing the data relating to the various styles, e.g. a "grading" programme.

In using the machine in the "teaching" mode, the operator first positions the shoe in the shoe support (18') of the machine and thereafter initiates a cycle of operation, whereupon the roughing tool is moved to a first position in relation to the shoe bottom. The operator then moves the tool under the control of the first operator-actuatable means to a first position of contact with a side wall portion of the shoe, selects the desired speed of rotation of the tool, and then operates the "teach" button, whereupon the digitised coordinate axis values for the point P, which is spaced from the side wall portion by a distance equal to the radius of the tool, is stored in the computer memory. Operation of the "teach" button also causes the tool to be advanced through a pre-set distance to a next point at which the tool is positioned outside the side wall portion of the shoe, and the operator then proceeds to determine the next position of the point P, as well as the desired speed of rotation of the tool to be applied in association with that point. In each case also of course the camber and tilt of the tool is determined using the further operator-actuatable means. This procedure is then repeated, the pre-set distance being the same between successive points, so that the whole of the path of the tool around the shoe is digitised and stored, together with information concerning motor speed and the camber and tilt of the tool.

It will thus be appreciated that, although along the side wall portions of the shoe, including in the regions of sharper curvature, namely the toe end and heel end thereof, the positions of the point P are equi-distant, and thus the speed of movement of the centre of the tool (along which the point P is located) will remain constant or substantially so in the operation of the machine in its "operating" mode, nevertheless the traverse speed of the tool in said areas of sharper curvature will be slower than along the straight (or straighter) portions, namely along the sides of the shoe, so that, using the centrifugal type of tool, excessive roughing could arise in said areas. This is avoided in the machine in accordance with the invention by the operator selecting a slower speed of rotation for the roughing tool. In this way, the relative speed between the side wall portion of the shoe and the operating surface of the tool can be caused to remain constant, or substantially so, throughout the traverse of the tool around the side wall portions.

It will of course be appreciated that flow control valves CV1, or CV2 are themselves adjustable in order to set the desired fast/slow flow control rates according to the work being operated upon. Such setting may be made by the operator or, if desired, again by electronic control.

I claim:

1. Machine for roughing side wall portions of a shoe comprising a shoe support, for supporting a shoe with side wall portions thereof to be roughed exposed, a rotary roughing tool supported by a tool support and comprising a plurality of roughing elements mounted for movement in a direction towards and away from the centre of rotation of the tool, the arrangement being such that said elements are urged centrifugally away from said centre by the rotation of the tool, and means for effecting relative movement, in directions extending lengthwise, widthwise and heightwise of the bottom of a shoe supported by the shoe support, between the shoe support and the tool support, whereby the tool is caused to operate progressively along the exposed side wall portions of a shoe supported by the shoe support, wherein the speed of rotation of the tool is varied, as the tool is caused to operate progressively as aforesaid, in accordance with the speed of relative movement between the tool and the side wall portions of the shoe (the traverse speed of the tool).

2. Machine according to claim 1 further comprising
first operator-actuatable means, operable in a "teaching" mode of operation of the machine, whereby the tool can be positioned at a plurality of selected points along the side wall portions of the shoe and such tool positions can be stored in the form of digitised coordinate axis values in a computer memory, and second operator-actuatable means, also operable in said "teaching" mode, for selecting a speed of rotation for the tool in association with each of said stored positions and for storing the selection in the computer memory, the arrangement being such that the stored positions represent the path of relative movement between the shoe support and the tool support to be followed in an "operating" mode of the machine, and each stored selection of the speed of rotation of the tool is implemented when its associated stored position is reached.

3. Machine according to claim 1 wherein the tool is caused to be rotated by a motor drive comprising a hydraulic motor and a flow control arrangement by which the flow of hydraulic fluid to the motor can be varied.

4. Machine according to claim 1 wherein the tool is caused to be rotated by a motor drive having a plurality of pre-set output speeds, and wherein the output speed of the motor drive is selected, from the various pre-settings, for each of the side wall portions of the shoe.

5. Machine according to claim 4 wherein the motor drive comprises a hydraulic motor and a flow control arrangement by which the flow of hydraulic fluid to the motor can be varied to provide a plurality of pre-set output speeds of the motor drive as aforesaid.

6. Machine according to claim 5 wherein the flow control arrangement comprises a plurality of flow control valves.

7. Machine according to claim 4 further comprising
first operator-actuatable means, operable in a "teaching" mode of operation of the machine, whereby the tool can be positioned at a plurality of selected points along the side wall portions of the shoe and such tool positions can be stored in the form of digitised coordinate axis values in a computer memory, and second operator-actuatable means, also operable in said "teaching" mode, for selecting a speed of rotation for the tool in association with each of said stored positions and for storing the selection in the computer memory, the arrangement being such that the stored positions represent the path of relative movement between the shoe support and the tool support to be followed in an "operating" mode of the machine, and each stored selection of the speed of rotation of the tool is implemented when its associated stored position is reached.

8. Machine according to claim 1 wherein the tool comprises two spaced-apart discs and, extending therebetween, a plurality of pins on each of which a roughing device is loosely mounted.

9. Machine according to claim 8 wherein each roughing device comprises a roll having a knurled or serrated operating surface.

10. Machine according to claim 8 wherein each roughing device comprises one or more plate-like elements having a roughing edge by which the shoe upper is engaged in a flail-like action as the tool is caused to rotate.

11. Machine for roughing side wall portions of a shoe comprising:

a shoe support, for supporting a shoe with side wall portions thereof to be roughed exposed;

a rotary roughing tool supported by a tool support and comprising a plurality of roughing elements mounted for movement in a direction towards and away from the centers of rotation of the tool, the arrangement being such that said elements are urged centrifugally away from said center by the rotation of the tool;

means for effecting relative movement, in directions extending lengthwise, widthwise and heightwise of the bottom of a shoe supported by the shoe support, between the shoe support and the tool support, whereby the tool is caused to operate progressively along the exposed side wall portions of a shoe supported by the shoe support;

first operator-actuatable means, operable in a "teaching" mode of operation of the machine, whereby the tool can be positioned at a plurality of selected points along the side wall portions of the shoe and such tool positions can be stored in the form of digitised coordinate axis values in a computer memory; and second operator-actuatable means, also operable in said "teaching" mode, for selecting a speed of rotation for the tool in association with each of said stored positions and for storing the selection in the computer memory, the arrangement being such that the stored positions represent the path of relative movement between the shoe support and the tool support to be followed in an "operating" mode of the machine, and each stored selection of the speed of rotation of the tool is implemented when its associated stored position is reached.

12. Machine according to claim 11 wherein the tool is caused to be rotated by a motor drive comprising a hydraulic motor and a flow control arrangement by which the flow of hydraulic fluid to the motor can be varied.

13. Machine according to claim 11 wherein the tool is caused to be rotated by a motor drive means having a plurality of pre-set output speeds, and wherein the output speed of the motor drive is selected, from the various pre-settings, for each of the side wall portions of the shoe.

* * * * *